United States Patent [19]

Terashita

[11] 4,397,545

[45] Aug. 9, 1983

[54] EXPOSURE CONTROL METHOD

[75] Inventor: Takaaki Terashita, Minami-ashigara, Japan

[73] Assignee: Fuji Photo Film Co., Ltd., Kanagawa, Japan

[21] Appl. No.: 258,699

[22] Filed: Apr. 29, 1981

[30] Foreign Application Priority Data

Apr. 30, 1980 [JP] Japan .................................. 55-57262
Apr. 30, 1980 [JP] Japan .................................. 55-57263

[51] Int. Cl.³ ............................................. G03B 27/32
[52] U.S. Cl. ........................................ 355/77; 355/38; 355/88
[58] Field of Search ................... 355/38, 68, 88, 77; 356/404

[56] References Cited

U.S. PATENT DOCUMENTS 4,101,216 7/1978 Grossmann ........................ 355/38 X
4,244,653 1/1981 Asai et al. .......................... 356/404

*Primary Examiner*—Richard A. Wintercorn
*Attorney, Agent, or Firm*—Sughrue, Mion, Zinn, Macpeak and Seas

[57] ABSTRACT

An exposure control method in which an exposure value for a designated or particular original picture is determined using in combination photometric values or exposure controlling characteristic values of a designated original picture and photometric values or exposure controlling characteristic values of at least one other original picture which is weighted with relativity to the designated original picture. With this method, pictures of similar or continuous scenes are reproduced with a uniform density and color. The method may be applied to photographic film, particularly, motion picture films, VTR photographing operations or picture printing operations.

9 Claims, 6 Drawing Figures

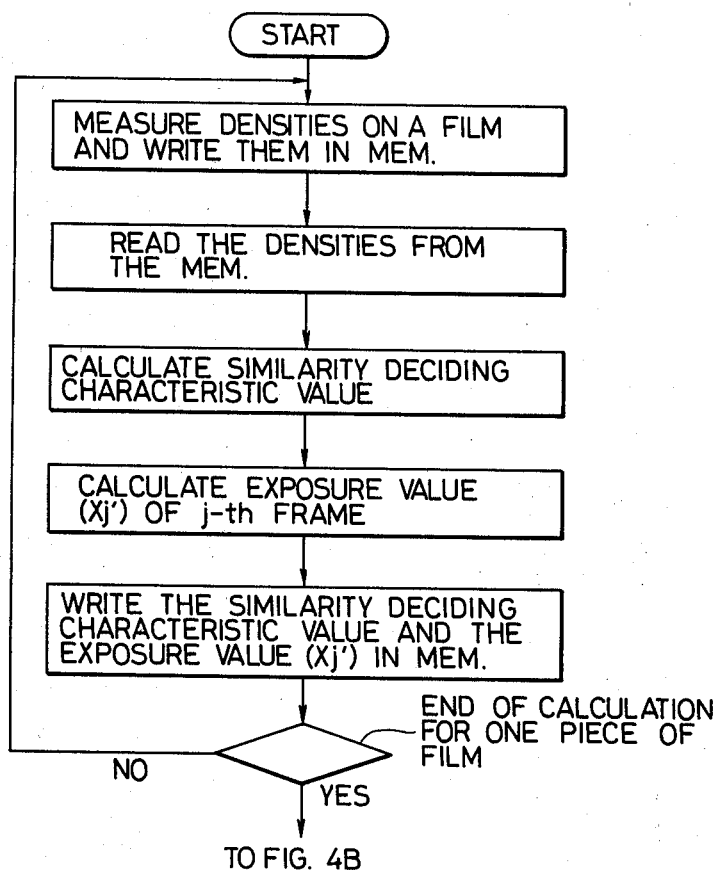

EXPOSURE CONTROL METHOD

BACKGROUND OF THE INVENTION

The invention relates to an exposure control method in which, when exposure data is determined in a picture printing device or a picture processing device such as a photographing camera, especially an 8-mm movie camera or a VTR camera, exposure data for a particular scene is determined utilizing the exposure data of several scenes before and after that scene.

When similar or continuous scenes are reproduced the reproduced scenes generally have the same density and color. Similar scenes, in general, differ from one another in details such as camera angle, background and the size and position of a photographed main object. However, if the exposure data of a scene is determined according to an exposure calculating expression using the maximum and minimum values of the photometric values of the similar scenes and the exposure data of a position on a main object (for instance the average photometric value of the central part of the main object), unlike the case where the exposure data is determined using an average characteristic value such as a large area average photometric value, if the scenes differ even slightly, the aforementioned exposure controlling characteristic values are greatly affected. As a result, the similar scenes are reproduced with non-uniform density and color.

This is a serious problem for a picture printing device, a photographing camera, etc. Usually, the prints of similar scenes provided by a picture printing device are arranged side-by-side in an album. If the picture thus arranged were to be observed separately, no differences would be immediately apparent. However, observed together the differences in density and color will be readily perceptible. Especially for an 8-mm camera or a VTR camera, it is desirable that similar, continuous scenes be reproduced as uniform in density and color as possible because pictures of such similar, continuous scenes, which are to be viewed in close sequence, are often taken by these cameras.

Examples of a conventional similar scene picture printing exposure data control method for a picture printing device have been disclosed in Japanese Laid-Open Patent Application Nos. 40942/1974 and 112345/1976. In the method of the former, the full-area transmission densities of several frames before and after a particular frame to be printed and/or the printing exposure data of frames which are regarded as equivalent in photographical optical quality as compared with the printing exposure data of the frame to be printed to determine correction data which is applied to the frame. In the method of the latter, the color balance is controlled as a function of both the average characteristic value of a group of frames and the characteristic value of the frame to be printed. Thus, in each of the conventional methods, the average value of the exposure data of a plurality of frames which are determined as similar scenes and the value of the exposure data of frame to be printed are employed. However, the conventional methods still involve a drawback. That is, in the conventional methods, the scenes are classified into two groups wherein in one group the scenes are similar and in the other group the scenes are not similar. The average value of the exposure controlling characteristic values of a plurality of original pictures which are determined as similar scenes is utilized. Accordingly, it is necessary to determine whether the scenes are similar to one another or not. The result of the determination greatly affects the exposure data control. In other words, the exposure data when scenes are determined as being similar is considerably different from the exposure data when the scenes are determined as not being similar. Thus, the conventional methods involve a serious drawback in that, if the determination is erroneous, then not only an exposure control is erroneously applied to a particular original picture, but also the exposure control of all of the original pictures from which the erroneous determination has been made is carried out erroneously.

SUMMARY OF THE INVENTION

In view of the foregoing difficulties, the invention provides an exposure control method in which an exposure value for a designated or particular original picture is determined using, in combination, the photometric values or exposure controlling characteristic value of the designated original picture and the photometric values or exposure controlling characteristic value of at least one other original picture which is weighted in accordance with relativity to the designated original picture, whereby the pictures of similar or continuous scenes are reproduced with as uniform density and color as possible.

As used herein, the term "original picture" is intended to mean all types of original pictures which are employed in picture photographing, VTR photographing or picture printing operations, including the original pictures of original objects.

The invention will be described with reference to the case where the technical concept of the invention is applied to a photograph printing exposure control device. However, as was described before, the invention can be applied to an exposure control device for an 8-mm camera or a VTR camera as well.

BRIEF DESCRIPTION OF THE DRAWINGS

FIGS. 4A and 4B are a flow chart illusrating operations of a central processing unit utilized in the scanner of FIG. 3.

DESCRIPTION OF THE PREFERRED EMBODIMENTS

Figure 1A:
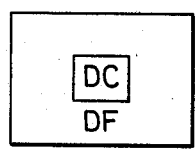
FIGS. 1A and 1B are explanatory diagrams each showing different regions of a picture surface.
Figure 1B:
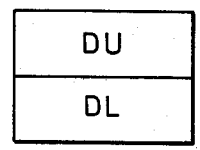

In accordance with a preferred embodiment of the invention, exposure data for a designated original picture is determined utilizing, in combination, the photometric values or exposure controlling characteristic values of the designated original picture and the photometric values or exposure controlling characteristic values of at least one other original picture which are weighted in accordance with similarity to the designated orginal picture.

The term "similarity" as herein used is intended to mean the degree to which original pictures are similar in content and arrangement to one another. The similarity can be determined according to a determination expression disclosed, for instance, in the specification of Japanese Laid-Open Patent Application No. 26729/1979.

More specifically, the similarity is defined by the following expression:

$$XX = 4.216 - 11.284\{|\Delta RG| + |\Delta GB|\} - 6.616\{|\Delta UL| + |\Delta RL|\} - 8.252 \times |\Delta CP| - 44.133 |\Delta DB| \quad (1)$$

where:

$|\Delta RG| = |(LATD'_{(R)} - LATD'_{(G)}) - (LATD_{(R)} - LATD_{(G)})|$,
$|\Delta GB| = |(LATD'_{(G)} - LATD'_{(B)}) - (LATD_{(G)} - LATD_{(B)})|$,
$|\Delta UL| = |(DL' - DU') - (DL - DU)|$,
$|\Delta RL| = |(DRI' - DLF') - (DRI - DLF)|$,
$|\Delta CP| = |\{(D'_{min} + D'_{max})/2 - LATD'_{(N)}\} - \{(D_{min} + D_{max})/2 - LATD_{(N)}\}|$, $$|\Delta DB| = \left| \frac{\Sigma(D'_{i+1} - D'_i)}{2} - \frac{\Sigma(D_{i+1} - D_i)}{2} \right|,$$

$LATD_{(N)} = 0.33(LATD_{(R)} + LATD_{(G)} + LATD_{(B)})$,
$LATD_{(R)}$: full-area average transmission density of red,
$LATD_{(G)}$: full-area average transmission density of green,
$LATD_{(B)}$: full-area average transmission density of blue,
$D_{min}$: minimum density of neutral grey,
$D_{max}$: maximum density of neutral grey,
$DU$: average density of the upper part of a picture,
$DL$: average density of the lower part of a picture,
$DRI$: average density of the right-hand part of a picture,
$DLF$: average density of the left-hand part of a picture,
$Di = 0.33(D_R + D_G + D_B)$;

and $D_R$, $D_G$ and $D_B$ are the red, green and blue densities of a photometric point. In addition, the characteristic values without apostrophes (') correspond to a designated frame to be printed and those with apostrophes correspond to other frames.

The maximum value of the result XX of calculation of the above-described determination expression is 4.216. This value decreases as the similarity descreases. Thus, similarities between pictures can be classified according to the values of XX.

In the case of a picture printing device, the photometric values or exposure controlling characteristic values of the frames of a piece of negative film having a number of original pictures and the similarity determining characteristic values as described above are stored. In printing the N-th frame, the similarity of each of the frames located before and after the N-th frame, such as the (N−1)-th frame, the (N−2)-th frame, and the (N+1)-th frame, the (N+2)-th frame are calculated according to the determination expression (1) above until XX<0 is reached.

In general, the exposure controlling characteristic value of the N-th frame can be obtained according to the following expression (2):

$$(Y_0)_m = \{K_0(Y_0)_m' + K_1(Y_1)_m' + \cdots + K_j(Y_j)_m'\}/(K_0 + K_1 + \cdots + K_j) \quad (2)$$

where:

m: an integer (1~j), the number of exposure controlling characteristic values,
$(Y_0)_m$: the exposure controlling characteristic value of the original picture (the N-th frame) for which an exposure value is to be determined with the exposure controlling characteristic value being obtained from a plurality of original pictures,
$(Y_0)_m'$: the exposure controlling characteristic value of the original picture (the N-th frame) for which an exposure value is to be determined with the exposure controlling characteristic value being obtained only from the original picture (the N-th frame),
$(Y_{1 \sim j})_m'$: the exposure controlling characteristic values of pictures (frames) other than the original picture (the N-th frame) for which an exposure value is to be determined, and $K_0$, and $K_1$ through $K_j$: constants of which $K_0 = 1.1$, and $K_1$ through $K_j$ are smaller than 1.0 and are determined from similarities of frames before and after the N-th frame.

Specifically, $K_1$ through $K_j$ are defined as follows:
When XX>4, $K_i = 1.0$,
when $4.0 \geq XX > 3.0$, $K_i = 0.8$,
when $3.0 \geq XX > 2.0$, $K_i = 0.6$,
when $2.0 \geq XX > 1.0$, $K_i = 0.4$,
when $1.0 \geq XX > 0$, $K_i = 0.2$, and
when $0.0 \geq XX$, $K_i = 0$.

Following the determination of the exposure controlling characteristic value, a printing exposure value X is determined from the following calculating expression (4) obtained by rewriting in general form the following calculation expression (3) as disclosed in the specification of Japanese Laid Open Patent Application No. 28131/1979 using the exposure controlling characteristic values $(Y_0)_m$ which are obtained according to expression (2) taking the similarities of frames before and after the designated present frame into account:

$$X = k_1 + k_2 D_{max} + k_3 D_{min} + k_4 LATD_{(N)} + k_5 CF + k_6 UL + k_7 DB + k_8 IR_{(N)} \quad (3)$$

where:

$CF = DC - DF$,
$UL = DL - DU$,
$RL = DRI - DLF$, and $$DB = \sum_{i=1}^{n} \frac{D_{i+1} - D_i}{n}, \text{ in which}$$

n: sequence number of each density measuring point,
$IR_{(N)}$: the number of density points which are determined as neutral color,
$DC$: the average density of the central portion of a picture,
$DF$: the average density of the peripheral portion of a picture,
$k_1$ through $k_8$: constant coefficients.

Equation (4) is then:

$$X = k_0 + \sum_{m=1}^{j} k_m (Y_0)_m \quad (4)$$

For every frame, a pattern classification (for instance into a low contrast negative, an underexposed negative, etc.) as disclosed in Japanese Laid-Open Patent Application No. 28131/1979 mentioned above may be carried out utilizing the characteristic value which is obtained using expression (2). This method can greatly reduce the probability that, although scenes are similar, they are determined as different patterns. Accordingly, an exposure value which reduces the fluctuation in density and color of the frames can be obtained.

Furthermore, the advantageous effects of the invention can be obtained even with the following modifications: The exposure value may be obtained directly by inserting the relevant data into an exposure value calculating expression such as expression (3) instead of expression (2), which directly inserted data may be a function of the value XX in determination expression (1). The characteristic value of one or more frames before the designated frame for which an exposure value should be determined may be stored in a memory to be used for determining the exposure value. However, it is preferable that with the characteristic value of each of the frames of a piece of negative film stored in a memory, the similarities of frames before and after the designated frame for which exposure value is to be determined are also detected. In this case, the number of frames whose similarities are detected may be limited to thereby reduce the time required for the calculations.

The exposure value of the N-th frame can be obtained according to the following expression:

$$X_0 = (K_0 X_0' + K_1 X_1' + K_i X_i')/(K_0 + K_1 + K_0) \qquad (5)$$

where:
$X_0$: the exposure value of a designated original picture (the N-th frame) which is determined from a plurality of original pictures,
$X_0'$: the exposure value of the designated original picture (N-th frame) which is obtained from the designated original picture only,
$X_1'$ through $X_i'$: the exposure values of original pictures other than the designated original picture (N-th frame), and
$K_0$ and $K_1$ through $K_i$: constants defined as above with respect to expression (2).

An embodiment of the invention has been described with reference to the picture printing exposure control device. However, it should be noted that the technical concept of the invention can be applied to a photographing camera, and especially to an 8-mm camera and a VTR camera. For a camera in which exposure operations are carried out successively, fluctuations in density and color of the reproduced pictures of similar scenes is a serious problem. However, this drawback can be eliminated by employing the method of the invention.

In general, a central-portion-accentuated photometric system in which the photometry of the central portion of a photometric part is accentuated, a partial photometric system in which only the central portion is subjected to photometry, and a photometric system using a plurality of photometric elements provide a more accurate exposure than large area average photometry. However, in these systems, exposure values for scenes remote from a designated scene for which correct exposure data is provided are lower in accuracy than in the case of large area average photometry. In these systems, the reproduced pictures of frames are liable to be non-uniform in density and color if the scenes are such that a main object, such as a person, moves during the operation of a camera or the scenes are variable as a camera pans. The method of the invention is effective in eliminating this difficulty. That is, as was described with reference to the picture printing exposure control device, the above-described difficulty can be substantially eliminated by determining the exposure value from a plurality of characteristic values which are weighted with the similarities of scenes or the photometric values themselves. In the case of a camera, the number of photometric elements is small, and therefore sometimes the photometric values can be employed directly for determining exposure value.

Exposure values obtained according to the central portion-accentuated photometric system described above or exposure value obtained from a plurality of photometric elements, such as according to a method disclosed in Japanese Patent Application No. 124363/1978 or 127654/1979, may be employed for an 8-mm camera or a VTR camera.

Furthermore, the exposure value may be determined as follows: According to the position of a frame concerning an available photometric value before a designated or present frame, or to the time interval between the time of photometric measurement of the frame concerning the photometric value and that of the present frame, the weight coefficient is decreased the further the frame is before the designated frame so that the exposure value is determined from a characteristic value obtained according to expression (2) or the photometric value data. This method utilizes the fact that it is generally true that as a frame approaches the present frame, its similarity increases. The relativity between an original picture frame for which exposure value is determined and other original picture frames includes geometrical similarity and time simirality as described above.

In another embodiment of the invention, according to the position of a frame concerning an available exposure value before a designated or present frame or to the time interval between the time of photometric measurement of the frame concerning the available exposure value and that of the present frame, the weight coefficient is decreased the further the frame is before the designated frame so that exposure value obtained according to expression (2) is employed for the present frame. This method also utilizes the fact that it is generally true that as a frame approaches the present frame, its similarity increases and that the relativity between an original picture frame for which an exposure value is determined and other original picture frames includes geometrical similarity and time similarity.

A particular feature of the invention is that, while in the prior art, frames are classified into a group in which the scenes are similar and a group in which the scenes are not similar and the average value of the data of a plurality of frames which are determined as similar scenes is utilized, the photometric values or characteristic values of frames which are weighted as to correlation or similarity between scenes to a designated frame for which an exposure value is to be determined are utilized.

A further advantageous effect of the invention resides in that in determining whether scenes are similar or not, the weight coefficient is decreased for scenes which are low in similarity to thereby decrease the effect of the erroneous determination of similar scenes.

Another advantageous effect of the invention is that, although the photometric value or characteristic value of a frame includes noise components, the reliability of characteristic values is improved by using the photometric values or characteristic values of a plurality of frames similar to or correlated to one another.

A yet further advantageous effect of the invention resides in that the frames of correlated or similar scenes have less fluctuation of density and color so that more uniform pictures are reproduced. In the prior art, for scenes which are determined as being similar, exposure value is provided in the same way irrespective of the degree of similarity. Therefore, pictures reproduced using the prior art methods are liable to have a lower quality than pictures reproduced with exposure values which are obtained from a single frame of a scene.

A still further advantageous effect of the invention resides in that frames have less fluctuations of density and color, since frames which heretofore were not considered as similar scenes are handled as having a low similarity or relativity.

An embodiment of the invention which is applied to an exposure determining device for a photograph printing device will now be described.

Figure 2:
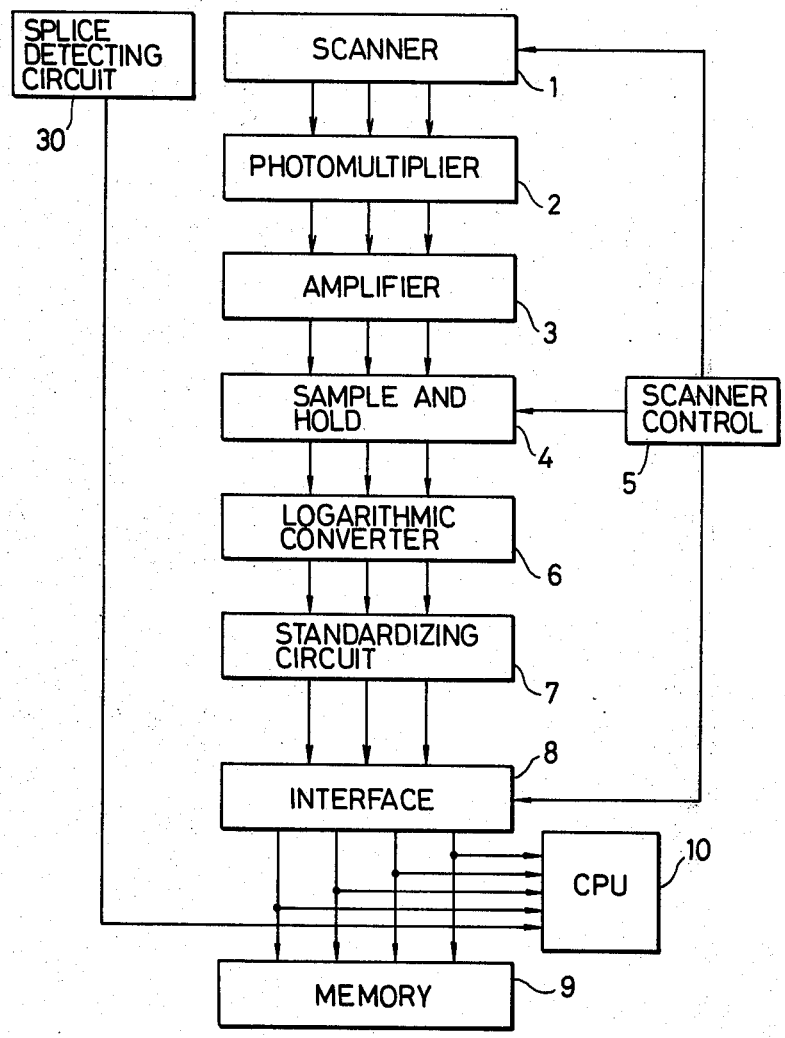
FIG. 2 is a block diagram showing an exposure determining device.

FIG. 2 is a block diagram showing the essential parts of the exposure determining device. The surface of a color picture film is scanned by a scanner 1 and a light beam transmitted through or reflected from the color picture film is separated into three color light beams (blue, green and red light beams) by a color separating optical device. The three color light beams are applied to a photomultiplier 2 having blue, green and red light receiving elements where they are measured separately.

The output measurement signals of the photomultiplier 2, after being amplified individually by an amplifier 3, are applied to a sample-and-hold circuit 4 where they are sampled and held. The sample-and-hold circuit 4 is controlled by a sampling pulse outputted by a scanner control circuit 5. As the scanning section of the scanner 1 is controlled by the scanner control cirucit 5, the sample-and-hold process is carried out in synchronization with the scanner 1 thus providing a number of measurement points which are regularly arranged on the surface of the color picture film. For instance in the case of a 35-mm color picture film having an area $22 \times 34$ mm$^2$, (omitting the periphery), each frame is scanned at intervals of 1 mm with a solid point 1 mm in diameter, which will be enlarged to a point about 3 mm in diameter on a color print. Accordingly, the picture surface is measured with 748 ($=22 \times 34$) measurement positions. The blue, green and red measurement signals of each measurement point sampled by the sample-and-hold circuit 4 are applied to a logarithmic conversion circuit 6 where they are subjected to logarithmic conversion to calculate a blue density B, a green density G and a red density R. More specifically, if the transmissivity is represented by T, (log 1/T) is calculated with circuit 6.

The blue, green and red densities B, G and R are applied to a standardizing circuit 7 where they are subjected to γ-correction and sensitivity correction according to the photosensitive material employed. Different γ-values and sensitivity values representing relationships between exposure data and density are provided by different film manufacturers and for different types of films. Accordingly, even if the same object is photographed under the same conditions, different types of films will have different densities.

Accordingly, the γ-correction is carried out as follows: A key is provided for every type of film to be processed. The keys are selectively operated according to the types of films and the density signals are corrected by adding predetermined constants thereto with an adder. Thereafter, the gain of the amplifier is adjusted so that the density signals thus corrected are multiplied by a correcting coefficient. In this manner, γ-correction is achieved.

By this method, the density signals are modified so that the same densities are provided for the same object. The blue, green and red densities B, G and R of the measurement point are supplied to an interface B and are stored in a memory 9 at corresponding addresses specified by measurement position signals outputted by the scanner control circuit 5. After the entire area of the negative film has been scanned, the data is read out of the memory 9 to a CPU (central processing unit) 10. In the CPU, the corresponding exposure calculating characteristic value and similarity determining characteristic value are calculated. The values thus calculated are stored at the same memory addresses.

After the measurement of a piece of film has been achieved as indicated by the output signal of a splice detecting circuit 30, the above-described characteristic values are read out of the memory 9 and loaded into the CPU so that, for instance, the similarity is determined according to equation (1), a new characteristic value is calculated according to equation (2) and an exposure value is calculated according to equation (4) or (3). In the case where the device is off-line with respect to the color printer, the exposure value is recorded on a punch tape or a magnetic tape to control the color printer.

Figure 4B:
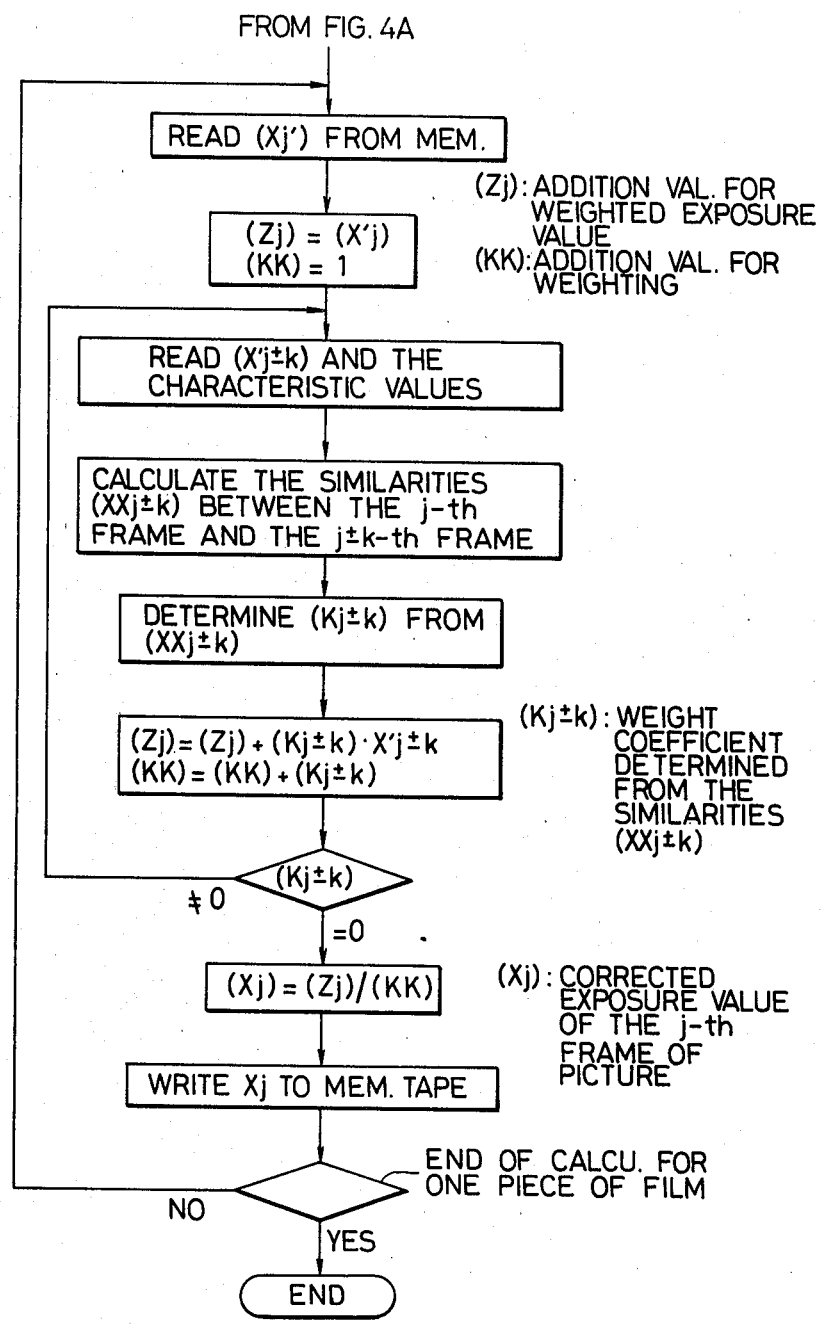

These operations are described in the flow chart of FIG. 4.

Figure 3:
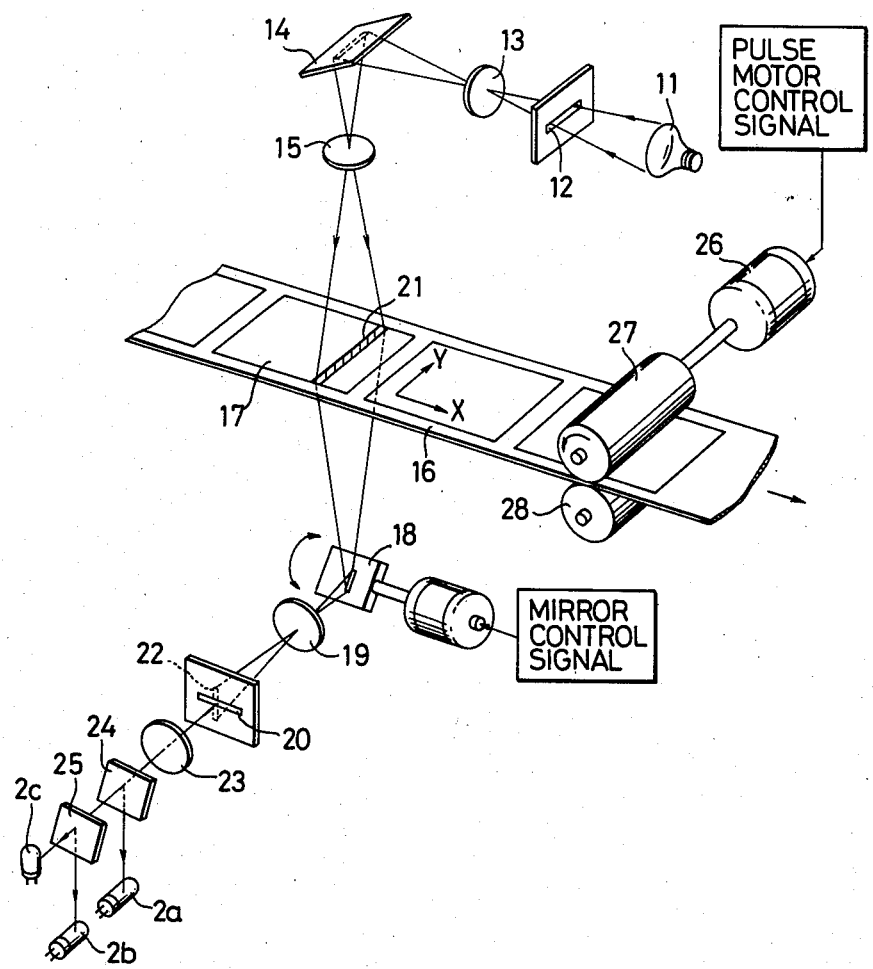
FIG. 3 is a perspective view showing essential components of a scanner employed in the device of FIG. 2.

FIG. 3 is a perspective view showing essential components of a scanner for measuring the transmission density of a negative film. An illuminating light beam emitted from a light source 11 passes through an elongated slit 12 and a lens 13 and falls on a reflecting mirror 14 as a result of which the illuminating light beam is bent downwardly by the reflecting mirror. Then, the illuminating light beam passes through a lens 15 to the picture surface 17 of a color picture film 16 to illuminate the picture surface widthwise. That is, a belt-shaped light beam is applied to the picture surface.

The belt-shaped light beam passed through the color picture film 16 is reflected by a scanner mirror 18 disposed below the film. The light beam thus reflected passes through a lens 19 prior to reaching a slit 20. The scanner mirror 18 may be fabricated by mounting a mirror on a galvanometer. The scanner mirror is moved by a sawtooth wave signal, i.e. a mirror control signal, outputted by the scanner control circuit 5 in FIG. 2.

The image 22 of a belt-shaped part 21 of the picture surface 17 of the illuminated color picture film is formed on the slit 20 in such a manner that the image 22 is perpendicular to the slit 20. As the scanner mirror 18 is moved at a predetermined speed in response to the mirror control signal, the image 22 is moved perpendicularly to the slit 20. Accordingly, different parts of the image 22 pass through the slit 20 as the image moves from one end to the other end.

The light beam, after it has passed through the slit 20, is applied through a lens 23 to dichroic mirrors 24 and 24 where it is separated into three color beams, red, blue and green beams. The three color beams are applied to photomultipliers 2a, 2b and 2c where the quantities of light thereof are separately measured.

The picture surface 17 is scanned in the Y-direction by the scanner mirror 18, then it is moved in the X-direction by a predetermined pitch and then scanned again in the Y-direction by the scanner mirror 18. To accomplish this, when the scanner mirror 18 returns to the original position after completing a scanning operation, the scanner control circuit 5 outputs a pulse motor control signal to turn a pulse motor 26 through a predetermined angle.

A film feeding roller 27 is coupled to the pulse motor 26 and the color picture film 16 is held between the film feeding roller 27 and a roller 28 so that the film 16 is moved a predetermined distance. Thus, the density data of each part of the picture surface 17 of the color picture film 16 is measured.

As described above with reference to the embodiment of the invention which is applied to an exposure determining device for a picture printing device, according to the method of the invention, exposure data for a designated original picture can be determined by using, in combination, the data of the designated original picture and the data of a plurality of other original pictures which are weighted in accordance with similarities to the designated original picture, whereby the reproduced pictures have fewer deviations of density and color when compared with one another.

What is claimed is:

1. In a picture processing method of the type comprising the steps of determining exposure data for a particular picture to be processed, correcting said exposure data in accordance with exposure data of at least one other picture to obtain corrected exposure data, and processing said particular picture in accordance with said corrected exposure data, the improvement characterized in that said correcting step comprises:

determining the degree of similarity between said particular picture and said at least one other picture;

weighting the exposure data of said at least one other picture in accordance with the determined degree of similarity to obtain weighted exposure data; and combining said particular picture exposure data and weighted exposure data to obtain said corrected exposure data.

2. The processing method as claimed in claim 1, wherein said exposure data comprises an exposure value, said weighted exposure data comprises a weighted exposure value and said corrected exposure data comprises a corrected exposure value, and said processing step comprises the step of printing a color print of said particular picture in accordance with said corrected exposure value, the improvement characterized in that said combining step comprises combining said particular exposure value and said weighted exposure value according to the equation:

$$X_0 = [K_0 X_0' + K_1 X_1' + K_i X_i']/[K_0 + K_1 + K_0]$$

where $X_0$ is said corrected exposure value, $X_0'$ is the determined exposure value for said particular picture, $K_1 X_1' - K_i X_i'$ are weighted exposure values of a plurality of other pictures, and $K_0$ and $K_1-K_i$ are constants representing the degree of similarity between said particular picture and each of said plurality of other pictures.

3. The processing method as claimed in claim 1, wherein said exposure data comprises an exposure controlling characteristic value, said weighted exposure data comprises a weighted exposure controlling characteristic value and said corrected exposure data comprises a corrected exposure controlling characteristic value, said combining step comprising combining said weighted exposure controlling characteristic values according to the equation:

$$(Y_0)_m = [K_0(Y_0)_m' + K_1(Y_1)_m' + \cdots + K_i(Y_i)_m']/(K_0 + K_1 + \cdots + K_i)$$

where m is an integer, $(Y_0)_m$ is the corrected exposure controlling characteristic value, $(Y_0)_m'$ is the exposure controlling characteristic value determined for said particular picture, $K_1(Y_1)_m' - K_i(Y_i)_m'$ are weighted exposure controlling characteristic values of a plurality of other pictures, and $K_0-K_i$ are weighting coefficients indicating the degree of similarity between said particular picture and said plurality of other pictures.

4. The processing method as claimed in claim 3, wherein said processing step comprises printing a color print of said particular picture in accordance with an exposure value X, said method further comprising the step of calculating said exposure value X according to the equation:

$$X = k_0 + \sum_{m=1}^{i} k_m (Y_0)_m$$

where $k_0-k_m$ are constants.

5. The processing method as claimed in any one of claims 2, 3 or 4, wherein said step of determining said degree of similarity between said particular picture and said at least one other picture comprises the step of determining a degree of similarity XX given by the expression:

$$XX = 4.216 - 11.284 \{|\Delta RG| + |\Delta GB|\} - 6.616 \{|\Delta UL| + |\Delta RL|\} - 8.252 \times |\Delta CP| - 44.133 |\Delta DB| \quad (1)$$

where:
$|\Delta RG| = |(LATD'_{(R)} - LATD'_{(G)}) - (LATD_{(R)} - LATD_{(G)})|$,
$|\Delta GB| = |(LATD'_{(G)} - LATD'_{(B)}) - (LATD_{(G)} - LATD_{(B)})|$,
$|\Delta UL| = |(DL' - DU') - (DL - DU)|$,
$|\Delta RL| = |(DRI' - DLF') - (DRI - DLF)|$,
$|\Delta CP| = |\{(D'_{min} + D'_{max})/2 - LATD'_{(N)}\} - \{(D_{min} + D_{max})/2 - LATD_{(N)}\}|$, $$|\Delta DB| = \left| \frac{\Sigma(D'_{i+1} - D'_i)}{2} - \frac{\Sigma(D_{i+1} - D_i)}{2} \right|,$$

$LATD_{(N)} = 0.33(LATD_{(R)} + LATD_{(G)} + LATD_{(B)})$,
$LATD_{(R)}$: full-area average transmission density of red,
$LATD_{(G)}$: full-area average transmission density of green,
$LATD_{(B)}$: full-area average transmission density of blue,
$D_{min}$: minimum density of neutral grey,
$D_{max}$: maximum density of neutral grey,
$DU$: average density of the upper part of a picture,
$DL$: average density of the lower part of a picture,
$DRI$: average density of the right-hand part of a picture,
$DLF$: average density of the left-hand part of a picture,
$D_i = 0.33(D_R + D_G + D_B)$ where $D_R$, $D_G$ and $D_B$ are red, green and blue densities of a photometric point, where values without apostrophes correspond to said designated frame to be printed and those with apostrophes correspond to other frames.

6. The processing method as claimed in claim 5, wherein said weighting step comprises determining values for $K_0-K_i$ according to: $K_0=1.1$;
when $XX>4.0$, $K_i=1.0$
when $4.0 \geq XX > 3.0$, $K_i=0.8$,
when $3.0 \geq XX > 2.0$, $K_i=0.6$,
when $2.0 \geq XX > 1.0$, $K_i=0.4$,
when $1.0 \geq XX > 0$, $K_i=0.2$, and
when $0.0 \geq XX$, $K_i=0$.

7. The processing method as claimed in claim 1, wherein said step of determining said exposure data of said particular picture comprises the step of scanning said particular picture to obtain photometric values of a plurality of measurement positions, determining a plurality of transmission density characteristics from said photometric values for said particular and said at least one other picture, and calculating said degree of similarity in accordance with the comparison of said plurality of transmission density characteristics from said particular and at least one other picture.

8. The processing method as claimed in any one of claims 2, 3 or 4, wherein said weighting step further comprises the step of adjusting said weighting coefficients in accordance with the proximity in time of the taking of said particular picture and the taking of said at least one other picture.

9. The processing method as claimed in any one of claims 2 or 4, wherein said exposure data of said particular and said at least one other pictures are measured from a single strip of film, said weighting step further comprising the step of adjusting said weighting coefficients in accordance with the distance between said particular picture and said at least one other picture along said strip of film.

* * * * *